(12) United States Patent
Martindale

(10) Patent No.: US 6,854,525 B2
(45) Date of Patent: Feb. 15, 2005

(54) TINE SYSTEM

(76) Inventor: James Martindale, 8231 N. Chaucer Ct., Columbus, IN (US) 47201

( * ) Notice: Subject to any disclaimer, the term of this patent is extended or adjusted under 35 U.S.C. 154(b) by 0 days.

(21) Appl. No.: 10/276,436
(22) PCT Filed: May 15, 2001
(86) PCT No.: PCT/US01/15729
§ 371 (c)(1),
(2), (4) Date: Jun. 12, 2003
(87) PCT Pub. No.: WO01/87042
PCT Pub. Date: Nov. 22, 2001

(65) Prior Publication Data
US 2004/0016553 A1 Jan. 29, 2004

Related U.S. Application Data
(60) Provisional application No. 60/245,040, filed on Oct. 27, 2000, and provisional application No. 60/204,281, filed on May 15, 2000.

(51) Int. Cl.$^7$ .............................................. A01B 23/02
(52) U.S. Cl. .................... 172/21; 172/122; 172/123; 172/540; 172/554; 111/121
(58) Field of Search ........................... 172/21, 22, 122, 172/123, 518, 540, 541–546, 552, 553, 554, 556, 557, 604, 751, 749, 753; 111/118, 120–122, 127–129

(56) References Cited

U.S. PATENT DOCUMENTS

| 2,708,866 A | 5/1955 | Shonts |
| 2,856,832 A | 10/1958 | Galazin |
| 4,383,580 A | 5/1983 | Huxford |
| 4,589,458 A * | 5/1986 | McCord, Jr. ................ 144/238 |
| 4,840,232 A | 6/1989 | Mayer |
| 5,064,001 A | 11/1991 | Walker |
| 5,586,731 A | 12/1996 | Glaze et al. |

FOREIGN PATENT DOCUMENTS

| GB | 2160401 A | 12/1985 |
| WO | WO 92/02119 | 2/1992 |

OTHER PUBLICATIONS

International Search Report.

* cited by examiner

Primary Examiner—Christopher J. Novosad
(74) Attorney, Agent, or Firm—Patterson, Thuente, Skaar & Christensen, P.A.

(57) ABSTRACT

A tine assembly comprising a plurality of individual tines, each tine with an arcuate shaped base section and a blade section. Each tine is mountable between a pair of hubs suds that each blade extends radially outward therefrom. The base portions are clamped, secured, or otherwise engaged between the hub assemblies. The blades may be positioned to be twisted in various angles about a line extending substantially radially outwards, by the use of wedge-shaped, arcuate blocks. The blocks and individual tines may be positioned in a multitude of different configurations to providing desired rotational positioning of the tine blade sections.

21 Claims, 6 Drawing Sheets

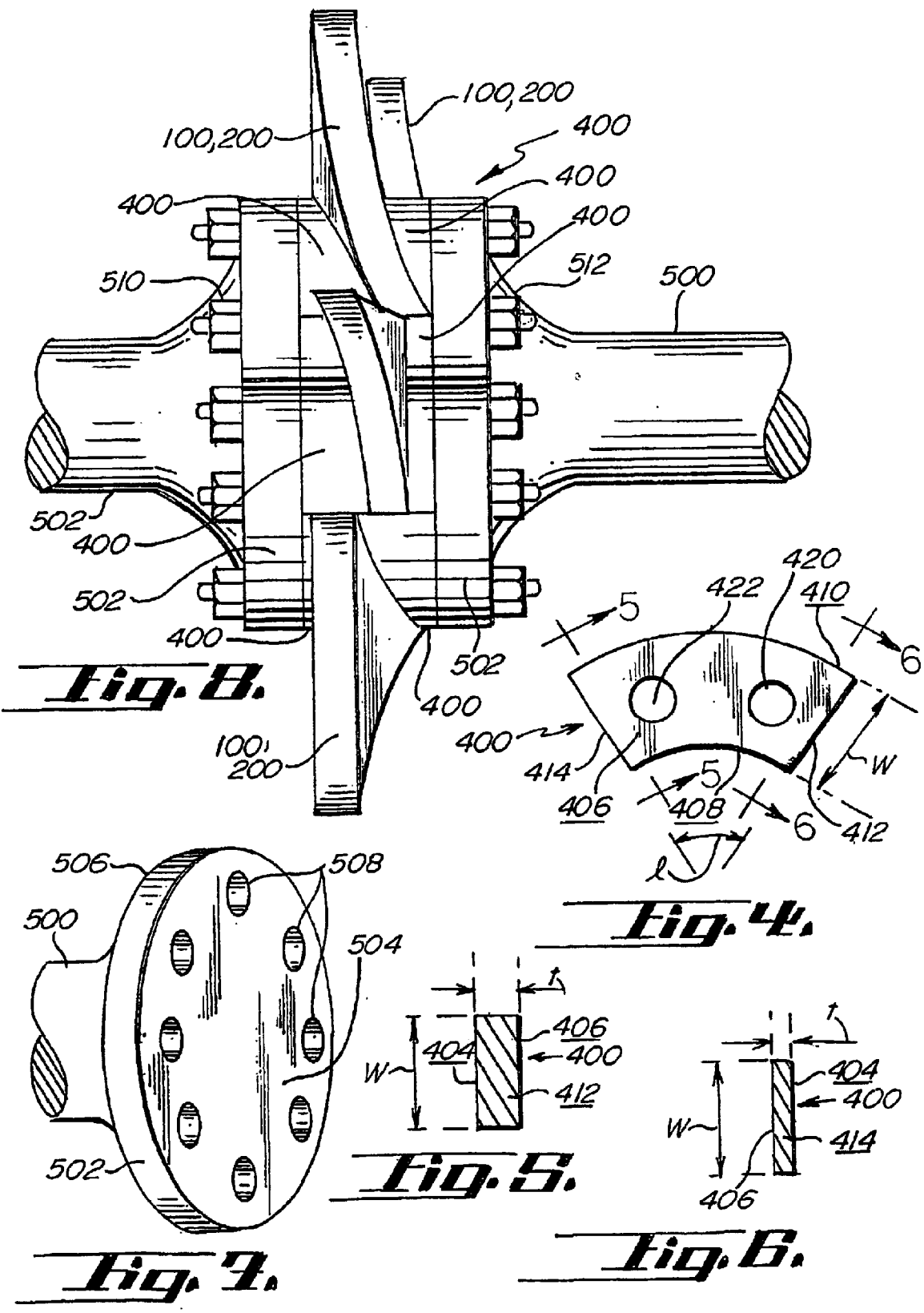

TINE SYSTEM

CROSS-REFERENCES TO RELATED APPLICATIONS

This application claims priority under 35 U.S.C. §119 (e) to, and hereby incorporates by reference, U.S. Provisional Application No. 60/204,281, filed 15 May 2000 and No. 60/245,040, filed 27 Oct. 2000.

BACKGROUND OF THE INVENTION

1. Field of the Invention

This invention relates to agricultural tillage equipment and, in particular, this invention relates to a tine and tine system for aerating soils with minimal disruption of the soil profile.

2. Background of Plows Invention

Persons producing crops are often confronted with two issues: soil compaction and soil erosion. Solutions to these issues are often contradictory in nature. Soil compaction occurs due to such phenomena as rainfall, overhead irrigation, tillage implements (e.g., tractors, planters, cultivators), and livestock. Soil compaction causes problems such as reduced water infiltration, restricted crop root growth, and lower amounts of oxygen for general plant growth and development. Tillage methods, such as moldboard plowing, were traditionally used to eliminate and/or reduce soil compaction. However, moldboard plows typically left the soil surface bare and exposed to wind and water erosion. To reduce soil erosion, compaction was often eliminated by using other tillage implements with sweeps or chisel-points. These implements had the advantage of leaving surface crop residue more-or-less intact to reduce soil loss due to erosion. However, the root structure of the crop plant residue was totally disrupted when these implements were used. Moreover, tillage practices with these implements often adversely affected trafficability and resulted in increased soil bulk density.

Without intending to limit the present invention, it is believed that silt soil particles are only slightly heavier than water. As water moves downward in a soil profile, the water transports silt particles with it, e.g., within the A-horizon. As the downward movement of water slows, the silt particles are deposited within the A-horizon to form a nearly indistinguishable layer initially. As this process continues over time, e.g., with additional precipitation, this layer becomes discrete and identifiable. Mechanical analysis of soil profiles verifies that silt accumulates over time at different depths, in differing soil types, with differing organic matter content, and root system environments. The creation and existence of this "density layer" (or accumulated silt) is one condition requiring tillage operations. Perforation of this silt layer and fracturing of the same restores more rapid water intake of soils. It is not necessary to lift, turn, and/or redistribute the silt in the A-horizon to restore water movement. Aeration of soil is, in fact, a true tillage since one of the major functions of tillage is to restore the water intake capability of a given soil. The accumulation of silt serves as a barrier to the exchange of water and soil atmosphere within a given soil. The importance of this phenomenon in causing sheet erosion in no-till situations and gully erosion in cases of traditional primary tillage techniques is directly related to the importance of the present invention.

In addition to the concerns stated above, moldboard plows and chisels are unsatisfactory in aerating soil profiles in which stands of perennials (e.g., pasture grasses, alfalfa) have been established. Obviously, using moldboard plows or chisels would destroy the stand of perennials, as well as potentially expose the surface of the soil to wind and water erosion. However, soil compaction frequently occurs in soils with perennial crop stands due to the effects of rain, irrigation, livestock traffic, tractors and baling equipment, and the like.

U.S. Pat. No. 4,383,580, issued 17 May 1983 to Huxford and hereby incorporated by reference, discloses an agricultural implement asserted as being suitable for aerating soils and pastures. The agricultural implement includes a frame attachable to a three-point tractor linkage, a plurality of shafts rotatably mounted on the frame, and a plurality of cutting blades projecting from each of the rollers. The blades are formed from plate material and are preferably formed to a point. Various edges of the blade are preferably doubled to assist the implement in cutting the soil without undue lifting or tearing of the soil surface.

U.S. Pat. No. 4,619,329, issued 28 Oct. 1986 to Gorbett and hereby incorporated by reference, discloses a soil aerator with a frame. A rotatable drum is mounted on the frame. The enclosed opposing ends of the drum carry axles, which are mounted within the frame, whereby the drum is rotatable with respect to the frame about the longitudinal axis of the drum. A plurality of triangular-shaped teeth are arranged in rows on an outer cylindrical surface of the drum. Each of the rows of teeth forms a chevron-shaped pattern with respect to the next succeeding row of teeth.

U.S. Pat. No. 4,840,232, issued 28 Jun. 1989 to Mayer and hereby incorporated by reference, discloses soil aerating equipment having a frame and at least one pair of shafts. The shafts are freely and rotatably mounted on the frame for rotation about the shaft longitudinal axes. The shafts extend in rearwardly inclined, opposite directions from a centerline of the frame. The rearward inclination of the shafts is adjustable to desired angles in the range of from about 90 degrees to about 120 degrees to the direction of travel. Each shaft carries a series of soil-engaging, substantially planar tines extending therefrom in vertical planes and positioned to sequentially engage and penetrate the soil with consequent rotation of the shafts when the frame is moved in the direction of travel. Each tine has a central, longitudinal axis, which extends behind the shaft rotational axis at a distance therefrom in the range of about 0.25 to about 1.75 inch. Each tine is twisted about a tine central, longitudinal axis at a fixed angle to a vertical plane parallel to the direction of travel in the range of from about 1 degree to about 30 degrees.

U.S. Pat. No. 5,020,602, issued 4 Jun. 1991 to Dellinger and hereby incorporated by reference, discloses an aerator for lawns and the like. The aerator has spiders formed from four identically-formed members. Each of these members has a tine on each end. Therefore, four members provide eight tines for the spider. The members are relatively narrow. Filler members at each end of the tine members provide stability to the spider. The spiders are carried by a frame. The frame carries a weight-receiving tray for carrying weight to assure penetration of the tines. Springs carry the tray on the frame, so that the springs will absorb energy resulting from engaging an impenetratable object.

U.S. Pat. No. 5,460,229, issued 24 Oct. 1995 to Mattis and hereby incorporated by reference, discloses a field aerator apparatus asserted as being useful for aerating grass or hay ground. The apparatus includes elongated spikes on a cylindrical drum. As the apparatus is towed across a field, the spikes penetrate and loosen the soil, as well as provide openings in the soil to improve water penetration and reduce water run-off. The spikes are secured to bands encircling the drum. The spacing between bands is adjustable, so that the spacing between spikes can be adjusted.

U.S. Pat. No. 5,611,291, issued 18 Mar. 1997 to Pogue and hereby incorporated by reference, discloses an aerator and seeder for untilled pasture land. The implement includes a frame and a cylindrical drum. The drum is rotatably mounted on the frame by a co-rotatable axial shaft. A plurality of rigid prongs are provided on the cylindrical surface of the drum. The prongs penetrate, agitate, and aerate the soil as the drum is rolled over the land to be seeded.

Many of the above-referenced documents are directed to reducing exposure of a soil to the erosion and enhancing trafficability thereon. The implements described use tines performing vertically to penetrate the soil profile, thereby reducing or eliminating soil compaction and aerating or restoring normal air-water exchange in the soil profile as well. These implements further minimize exposure to erosion by retaining above-ground and below-ground crop residue. However none of the implements described in these documents 1) provides tines without abrupt radius changes; 2) provide a tine with a cavity (and optional soil retaining surfaces thereon) to catch soil and thereby abrade soil on the surface of the tine against soil being aerated; 3) provide a tine assembly with a key slot on both sides of the tine base to enable the tine to be reversibly mounted; and 4) provide a tine with a slot or opening for injecting fluids (e.g., fertilizer) into the soil during an aeration procedure.

SUMMARY OF THE INVENTION

This invention substantially meets the aforementioned needs of the industry by providing a tine to aerate soils without destroying above-surface or below-surface plant residue. The mounted tine may be adjustable with respect to degree and direction of rotation and inclination. An aerator implement of this invention includes tines mounted at any desired degree and direction of rotation and at any desired degree of inclination with respect to the aerator implement centerline. The tine includes base and blade portions. The tine base portion may include an arcuate slot or key way, optional radial slots, and a plurality of holes. The arcuate slot enables the tine to be reversibly mounted so that either of two blade edges will initially engage soil being aerated. The holes accommodate fasteners such as bolts and optionally provide an egress for fluids being applied to the soil, such as fertilizer. The radial slots provide a surface to further secure the tine against rotational forces when in use. The tine blade portion may include a soil retaining surface geometry, such as a concave portion, to catch some of the soil being aerated. The concave portion (as well as other blade surfaces) may also have soil retaining surface geometry, such as a raised grid to catch some of the soil being aerated, so that abrasive wear on the tine blade is minimized by abrading soil-against-soil, rather than abrading soil against the tine blade. The tines may be mounted with a desired degree and direction of rotation by using shims. The shims may include surfaces contoured to mate with the slot and holes in the tine base portion. The shims may be tapered at a desired angle to provide the desired degree of twisting or rotation. The shims may also be tapered to provide a desired degree (extent) of tine inclination.

Liquids, such as fertilizers, may be injected into the soil being aerated by the present aerator. The liquids are conveyed to the rotating tines by using a metering spacer, metering ring, and a band. The metering spacer rotates with the implement axle. The metering ring and band are stationary. The metering spacer defines a groove and a plurality of lumens opening into the groove. The metering ring has a slot. The band maintains the metering spacer and ring in an operative relationship, in which the metering ring is disposed around the metering spacer groove. A tube extends through the band and opens proximate the slot. Fluid to be applied is conveyed through the tube, then through the slot. From the slot, the fluid enters the spacer groove. From the spacer groove, the fluid is conveyed to the tines, through the spacer lumens. The fluid is forced through the holes in the present tines onto slots defined in the tine blades, from where the fluid is injected into the soil profile. The fluid is injected into the soil profile at a point below the soil surface via the tine injection slot. Injection of fluids below the soil surface prevents loss of nutrients from volatilization and runoff. Reduced or eliminated nutrient loss from runoff greatly minimizes surface water pollution from such nutrient minerals such as phosphate and nitrogenous compounds. In at least one tine configuration, wherein soil is uplifted by tines when being aerated, the present aerator further prevents loss of nutrients by further covering applied nutrients with soil uplifted from below the soil surface.

A desired number of the tines are radially mounted in a set between two hubs, the hubs being fixed (or integral) to axles. A desired number of sets connected to axles thusly are said to form a gang. The tines may be mounted so that the tines are in a helical arrangement as an entire gang of tines is viewed. The mounted tines may be rotated clockwise or counterclockwise and may further be inclined toward, away from, or perpendicular to, the implement centerline in a desired configuration. Alternatively, the ends of the present tines may be angled at a bend in the tine, so that the mounted tines bend toward or away from, the implement centerline.

It is therefore an object of this invention, to provide a tine without abrupt radius changes in the body of the tine to thereby avoid concentrated shear forces otherwise present because of the tine design. Sharp radius changes between the blade and the base in existing art result in excessive breakage, especially in adverse or rocky conditions.

A further object of this invention is to provide a tine with a concave surface to retain soil on the concave surface of the tine blade and thereby minimize abrasive wear on the tine blade by abrading soil-against-soil, rather than soil against the tine blade.

A yet further object of this invention is to provide a tine with base surface features enabling the tine to be reversibly mounted on an aerating implement. These features may include a generally arcuate basal edge, bolt holes, one or more opposing arcuate grooves and one or more opposing radial grooves.

A yet still further object of this invention is to provide a tine with soil retaining surfaces, such as raised grids, which will retain soil. The retained soil on the soil retaining surfaces diminishes tine wear because an appreciable amount of the abrasion encountered by the tine during use is soil-to-soil abrasion. A lesser amount of the abrasion encountered by the tine during use is tine-to-soil abrasion.

A still further object of this invention is to provide a tine, which can inject fluids such as fertilizers into the soil when the soil is being aerated by the tine. The fluids may be injected into the soil profile to prevent loss by volatilization or runoff otherwise occurring if the fluids were left on the soil surface. In some tine configurations, loss of applied fluids is further minimized by soil being deposited on the soil surface due to the soil uplifting function of the tines.

BRIEF DESCRIPTION OF THE DRAWINGS

FIG. 4 is a plan view of a second lateral side of the shim of FIG. 3;

FIG. 5 is a view of a first end of the shim of FIG. 3;

FIG. 6 is a view of a second end of the shim of FIG. 3;

FIG. 7 is a perspective view of an axle and hub used to mount the present tine;

FIG. 8 is a plan view of one embodiment of the present tine and shims of this invention mounted between two hubs of an aerator;

It is understood that the above-described figures are only illustrative of the present invention and are not contemplated to limit the scope thereof.

DETAILED DESCRIPTION OF THE INVENTION/DRAWINGS

Comprehension of this invention can be gained through reference to the drawings in conjunction with a thorough review of the following explanation. Any references to such relative terms as front, back, right, left, top, bottom, upper, lower, horizontal, vertical, inboard, outboard, and the like, are intended for convenience of description and are not intended to limit the present invention or its components to any one positional or spatial orientation. All dimensions of the components in the attached figures may vary with a potential design and the intended use of an embodiment of the invention without departing from the scope of the invention. Unless stated otherwise, relative descriptions of tine rotation angles and inclination with respect to the present aerator implement are from the perspective of the direction of travel and/or an aerator implement centerline.

Figure 1A:
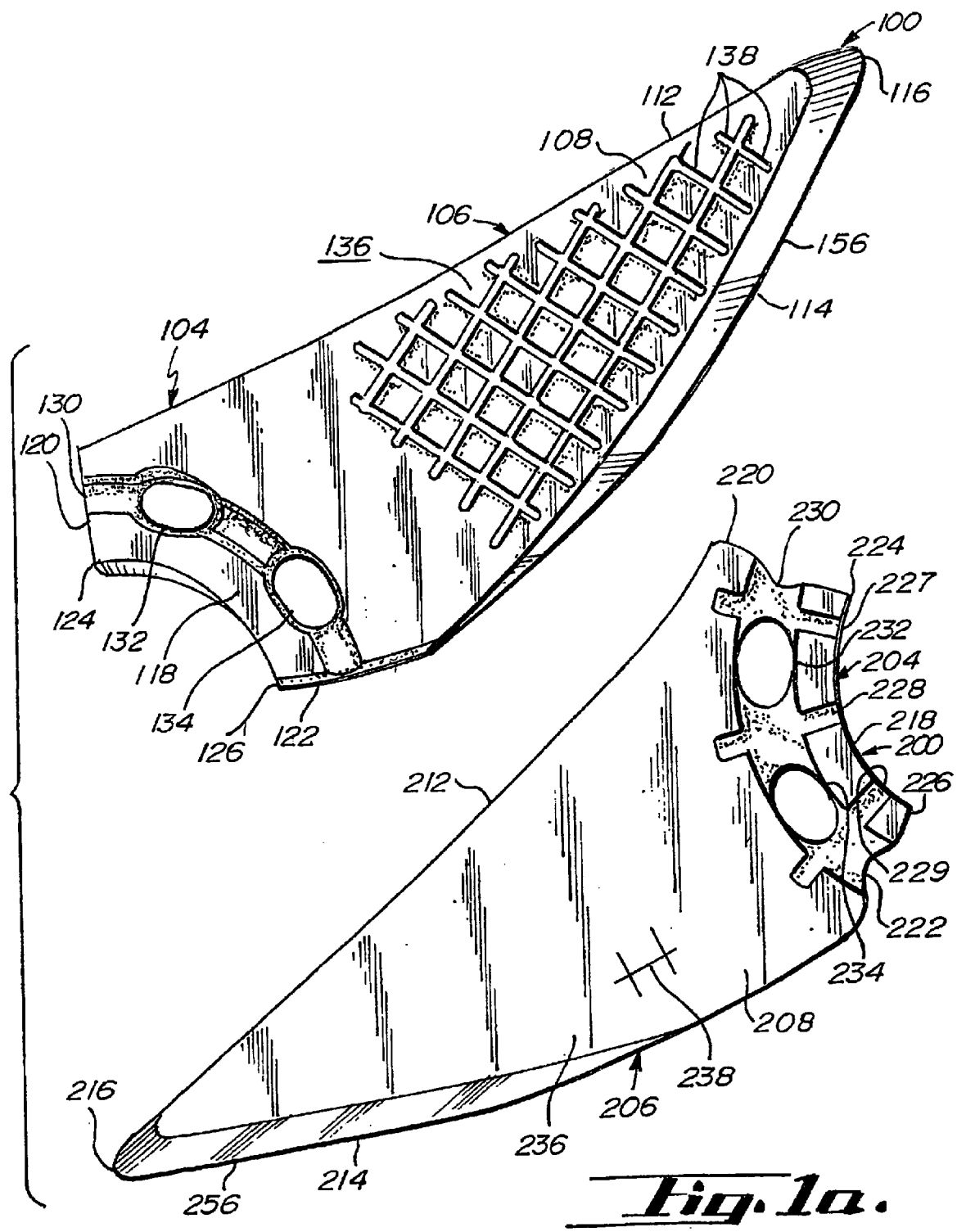
FIG. 1a is a plan view of a first side of two embodiments of the present tine.
Figure 1B:
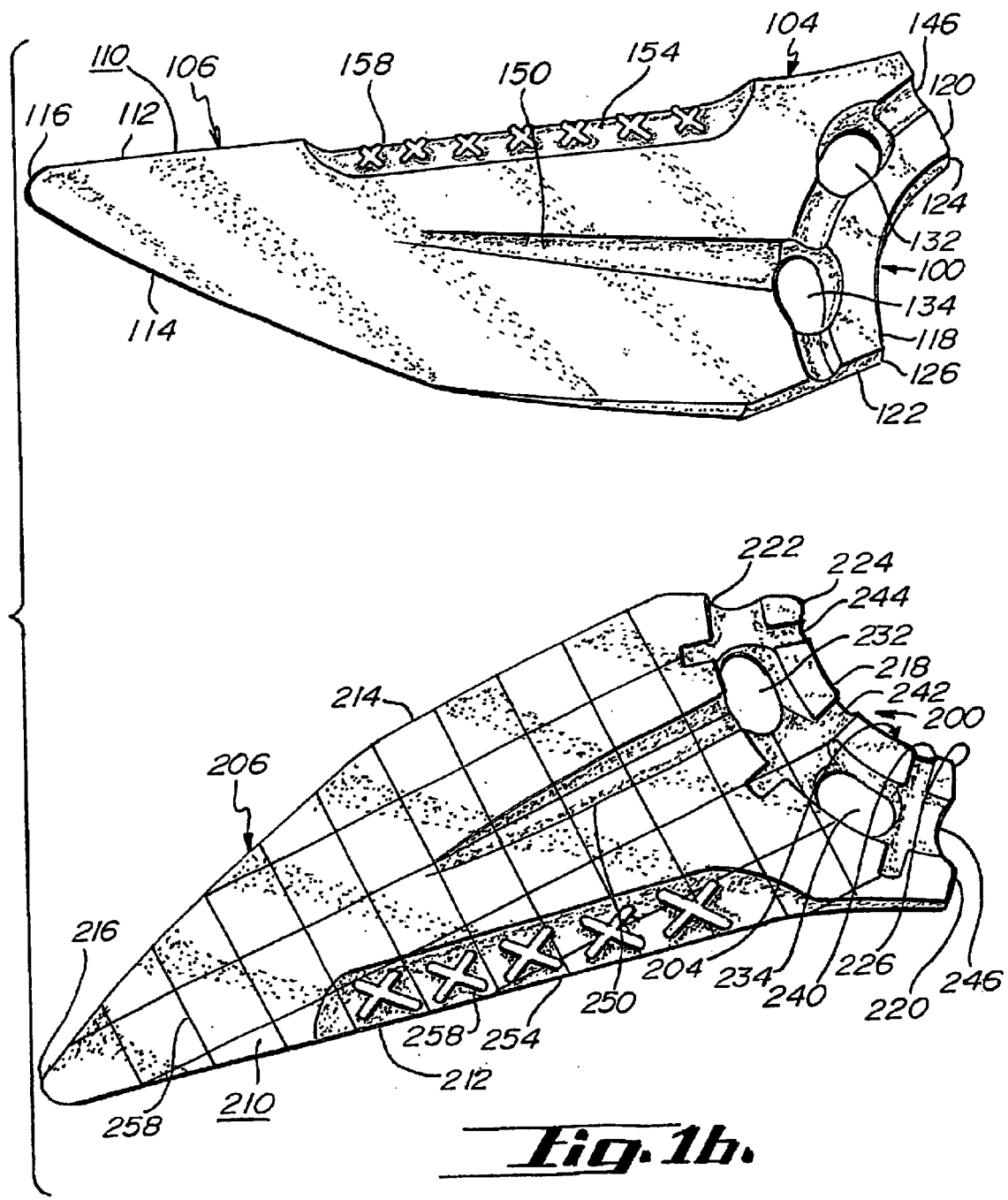
FIG. 1b is a plan view of a second side of the two tine embodiments of FIG. 1.
Figure 3:
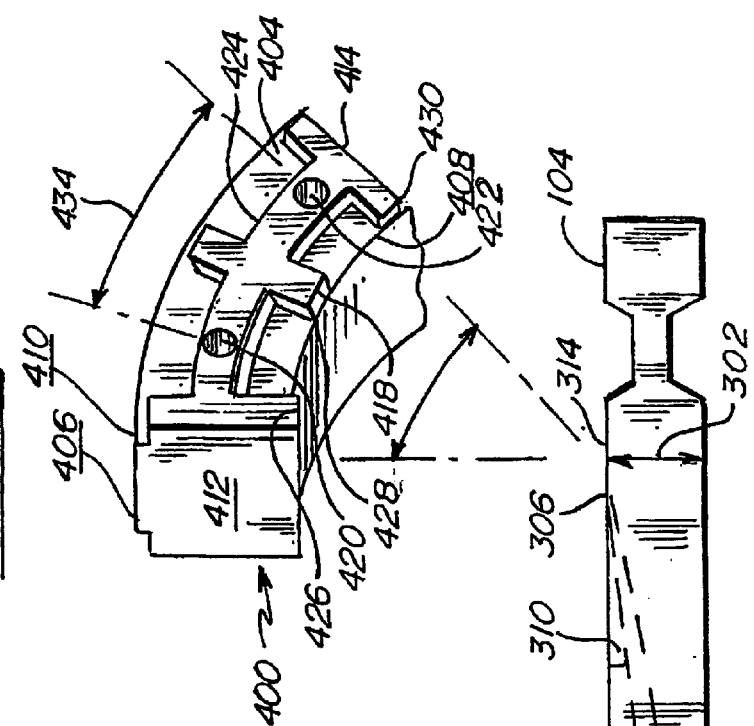
FIG. 3 is a perspective view of a first lateral side of one embodiment of a shim of the present invention.

The first embodiment of the tine of this invention is depicted in FIGS. 1a and 1b generally at 100. The tine 100 is unitary (or otherwise integral) in this embodiment, but may be considered to include a base portion 104 and a blade portion 106. The tine 100 displays a first side (surface) 108 and a second side (surface) 110. With respect to the blade 106, the tine 100 displays a first edge 112 converging with a second edge 114 at a tip 116. With respect to the base 104, the present tine displays a third edge 118. The third edge 118 converges with a fourth edge 120 and a fifth edge 122 at 124 and 126, respectively.

Referring particularly to FIG. 1a and viewing the first side 108 of the tine 100, an arcuate slot 130 and holes 132 and 134 are defined in the base 104. In this embodiment, the slot 130 extends between the fourth and fifth edges 120 and 122, generally following the arcuate contour of the third edge 118. At least a portion of the blade portion of the first side 108 is configured as a soil retaining surface geometry by being "dished-out" to a concave surface 136. A raised portion (or more generally a soil retaining surface geometry), such as a grid 138, is present within the concave 136 in this embodiment. With reference to the view of the second side 110 of the tine 100 depicted in FIG. 1b, the base portion 104 defines an arcuate slot 146, which extends between the fourth and fifth edges 120 and 122 and generally follows the contour of the third edge 118. At least in part, the holes 132 and 134 extend between the surfaces defined by the slots 130 and 146. A slot 150 is defined in the blade and base portions of the second side 110. The slot 150 slopes from the surface of the second side 110 and opens into the hole 134. As will be seen below, a lumen (tunnel) extending between the hole 134 and the surface of the second side 110 could be present in lieu of the slot 150. Referring to FIGS. 1a and 1b, a first bevel 154 extends between the first edge 112 and the second side 110. A second bevel 156 extends between the second edge 114 and the first side 108. In the embodiment depicted, a raised pattern (or more generally a soil retaining surface geometry), such as a grid 158, is present on the surface of the first bevel 154.

Figure 2:
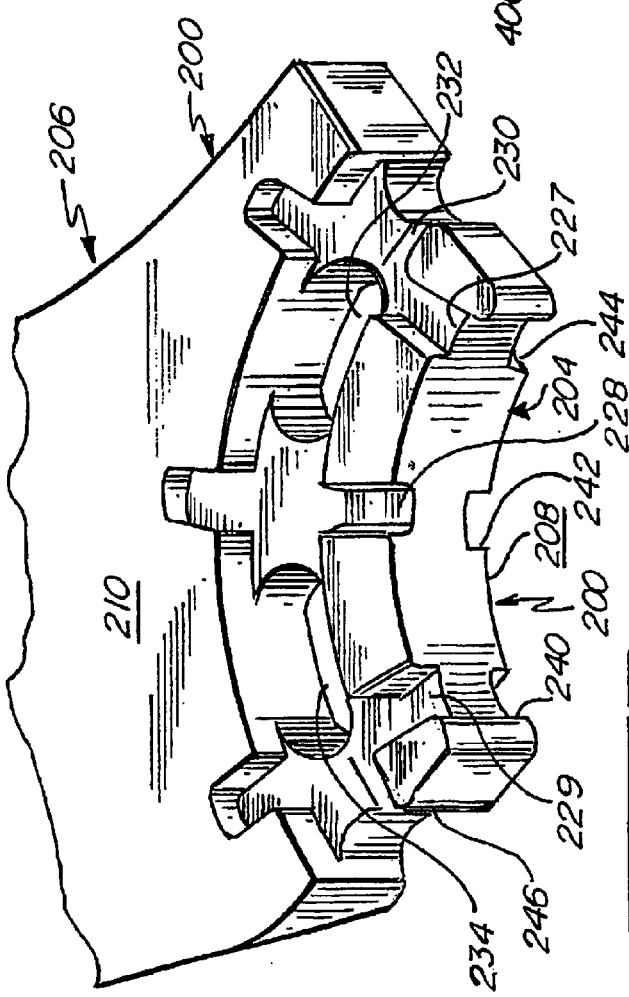
FIG. 2 is a perspective view of the base portion of the second tine embodiment of FIG. 1.

FIGS. 1a, 1b, and 2 depict a second embodiment of the present tine generally at 200. The tine 200 is unitary (or otherwise integral) in this embodiment, but may be considered to include a base portion 204 and a blade portion 206. The tine 200 displays a first side (surface) 208 and a second side (surface) 210. Respective first and second edges 212 and 214 extend from a tip 216 to define, in portion, the blade 206. The base portion 204 displays a third edge 218, which converges with respective fourth and fifth edges 220 and 222 at 224 and 226. Radial slots 227, 228, and 229, an arcuate slot 230, and holes 232 and 234 are defined on the first side 208 in this embodiment. The arcuate slot 230 generally follows the contour of the third edge 218 and extends between edges 220 and 222. The slots of the present tine base, such as 130 and 227–230, represent contours used to secure the present tine in place. However, in place of depressions, such as the slots 130 and 227–230, the present tine may also include raised surfaces. Although not depicted, a raised surface, such as the grid 138 could be present at each of the sides 208 and 210. However, in the embodiment depicted as tine 200, a generally intersecting linear grid 238 of grooves is inwardly defined from the surface 208. A portion of the tine blade 206 may be "dished-out" to form a soil retaining surface geometry, such as a concave surface 236 on the first side 208 in the blade portion 206. With respect to the second side 210, the base portion 204 defines radial slots 240, 242, and 244 and an arcuate slot 246. The holes 232 and 234 extend between the surfaces defined by the slots 230 and 246 in this embodiment. The arcuate slot 246 generally follows the contour of the third edge 218 in this embodiment. As best seen in FIG. 2, the slots 227, 228, and 229 are generally opposite the respective slots 244, 242, and 240. Moreover, the arcuate slots 230 and 246 are generally opposed as well. Although not shown, the generally opposed relation between the slots 130 and 146 of the tine 100 is the same, or substantially the same, as depicted in FIG. 2 with respect to the arcuate slots 230 and 246. A slot 250, more fully discussed below, extends from the hole 232 to the surface 208. A first bevel 254 extends from the second side 210 to the first edge 212 and a second bevel 256 extends from the second side 208 to the second edge 214. A soil retaining surface geometry, such as a grid 258, may be defined on the first bevel 254 In this embodiment, the grid 258 represents a series of intersecting, substantially linear depressions.

Figure 1C:
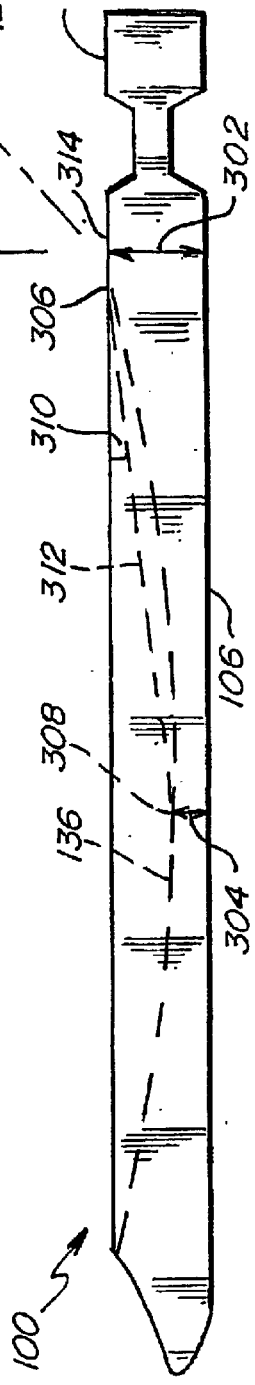
FIG. 1c is a side view of the first embodiment of the tine of FIG. 1.

There are no abrupt radius changes from the base portion to the blade portion of the present tine. Hence no radial fracture forces are generated because of the lack of abrupt radius changes. FIG. 1c depicts a side view of the tine 100. A portion of the concave 136 generally coinciding with a longitudinal axis of the tine is indicated in phantom. In contrast to the tines of the prior art, present tine gradually transitions from a base thickness 302 to a minimum concave thickness 304. In the embodiment depicted, the transition from the base thickness to the minimum concave thickness can be characterized by an angular relation from the transition point 306 to the point 308 at which the thickness is at a minimum. The point 308 may also be characterized as the point nearest the transition point 306 at which the thickness is at a minimum. The transition point is considered to be the position along the longitudinal axis at which the thickness of the present tine begins to decrease. The transitioning of the present tine, as described above, may be further characterized by an angle 310 describing the angular relation between lines 312 and 314. The line 312 extends between the transition point 306 and the point of minimum thickness 308. The line 314 describes the generally horizontal contour of the surface of present base portion. The angle 310 may be between about 1 degree and 20 degrees, between about 5 degrees and 15 degrees, between about 7 degrees and 13 degrees, or about 10 degrees. Stated otherwise, and by way of illustration and not limitation, for a tine of this invention with a length of about 8.75 inches, a base portion with a thickness of about 0.8 inches tapers to a minimum blade (concave) thickness of about 0.5 inch at a radius of about 8 inches, at a radius between about 6 inches and 10 inches, or at a radius between about 4 inches and 12 inches. The transitioning described above imparts a resistance to the breakage frequently encountered with respect to tines of the prior art.

Referring to FIGS. 3–6, the present invention includes an angle-adjusting device, depicted as a shim 400. The shim 400 displays opposed respective first and second lateral surfaces 404 and 406, generally arcuate lower and upper surfaces 408 and 410, and substantially flat end surfaces 412 and 414. A raised portion 418 extends from the first lateral surface 404. Holes 420 and 422 extend between the raised portion 418 and the second lateral surface 406. While the raised portion 418 is generally continuous in this embodiment, it may be considered to include an arcuate section 424 and optional radial sections 426, 428, and 430. The holes 420 and 422 align with holes 132 and 134 of tine 100 and with holes 232 and 234 of the tine 200. The raised section 424 is disposed and dimensioned to be received in arcuate slots 130 or 146 of the tine 100 or arcuate slots 230 or 246 of the tine 200. If the radial grooves are present in the present tine base, the radial sections 426, 428, and 430 are disposed and dimensioned to be accommodated in the radial sections 227, 228, 229, 240, 242, and 244. Angles 432 434 may, in part, define the dimensions of the shim 400. The angle 432 defines the arc through which the shim 400 extends, e.g., 90 degrees. The angle 434 defines the spacing of the holes 420 and 422, e.g., 30 degrees. If the tine of this invention uses raised surfaces rather than slots, the present angle adjusting devices would be modified to define depressions, which would mate with the tine raised surfaces.

Referring to FIGS. 4, 5, and 6, the shim 400 is depicted, displaying the substantially smooth shim surface 406 and a taper from end surface 412 to end surface 414. In the absence of a taper, a planar dimension of the present tine is generally perpendicular to the axis of the axle to which the tine is mounted. A nonlimiting recitation of the extent of taper will enable the present tine to be mounted so that the tine plane is rotated to a desired extent, either clockwise or counterclockwise, with respect to the axis of the axle to which the tine is mounted. By way of illustration and not limitation, one such extent of rotation is a multiple of 2.5 degrees, e.g. 2.5 degrees, 5.0 degrees, 7.5 degrees, and 10.0 degrees. The thickness t of the shim 400 changes along the shim length 1 and remains substantially uniform with respect to the shim width w. However, a tapering width w may be present in some embodiments of the present shim. A tapering width will enable the present tine attitude (direction and extent of tipping) to either be toward, or away from, a centerline of the aeration implement. The significance of tine attitude will be discussed below.

Referring to FIGS. 7 and 8, the present tines are advantageously mounted on an aerator with a plurality of axles 500. Each axle end terminates in a hub 502. Each of the hubs 502 displays respective inboard and outboard surfaces 504 and 506 and defines a plurality of holes 508, which extend between the surfaces 504 and 506. Now referring particularly to FIG. 8, the present tines and shims are deployed to achieve a desired extent of rotation as described above. In the example depicted in FIG. 8, the present tines 100, 200 are mounted between two of the present shims 400 so as to impart the desired degree of rotation to the tine planes. The shims 400, in turn, are disposed between inboard surfaces 504 of hubs 502. The tines, shims, and hubs are fixed into place with fasteners, such as bolts 510 (extending through the holes 132, 134, 232, 234, 420, 422, and 508) threaded onto nuts 512. The combination of the reversible shims and reversible tine of this invention enables a high degree of versatility of mounting options. The present tine can be mounted such that it 1) inclines toward or away from the implement centerline; 2) is rotated toward or away from the implement centerline; and 3) is in either the forward or rear position. Therefore, at least eight mounting configurations are possible with each shim combination.

Suitable materials for use in making the present tine and shim include ductile iron and carbidic ductile iron, each optionally undergoing a tempering, such as an austemper protocol to a grade 5 level of hardness, after the tines and shims have been formed.

Figure 9:
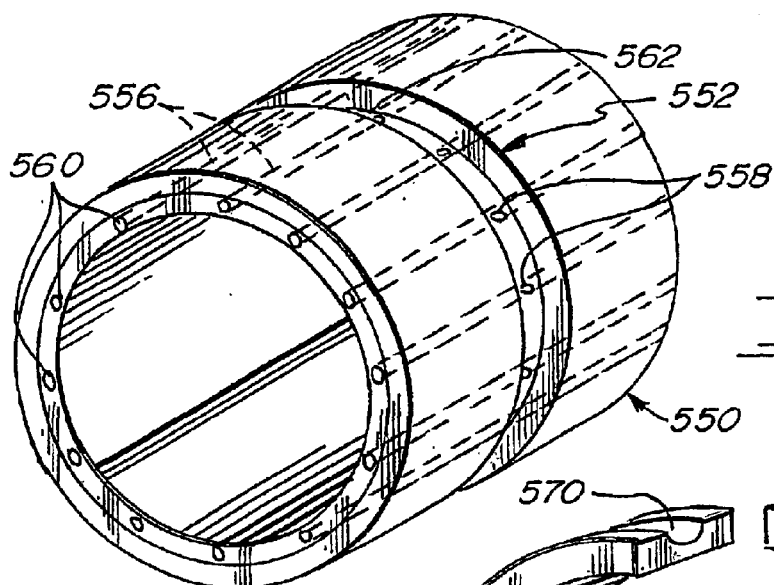
FIG. 9 is a perspective view of one embodiment of a fluid metering spacer of this invention.
Figure 10:
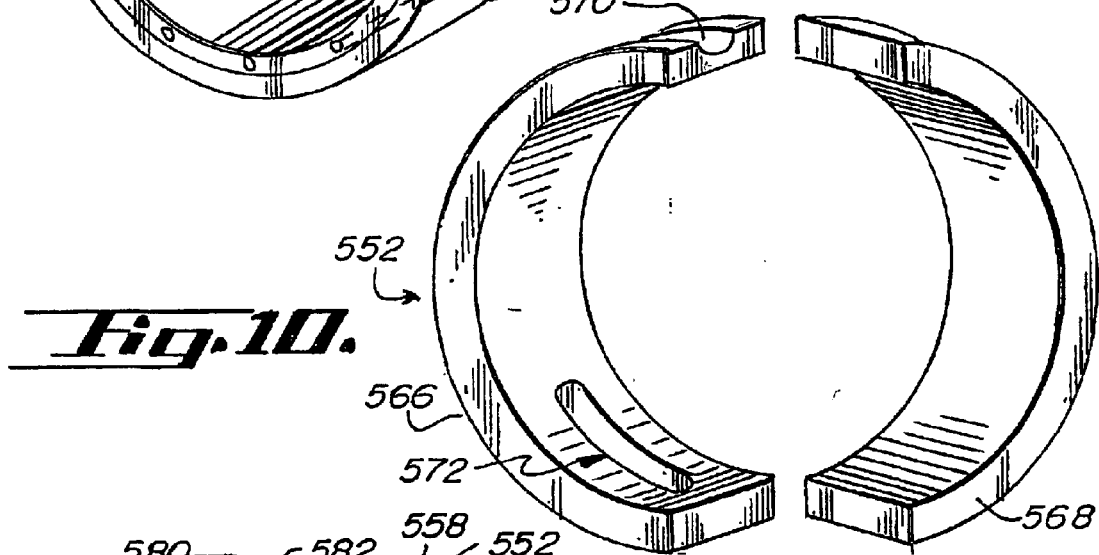
FIG. 10 is a perspective view of a fluid metering ring of this invention.
Figure 11:
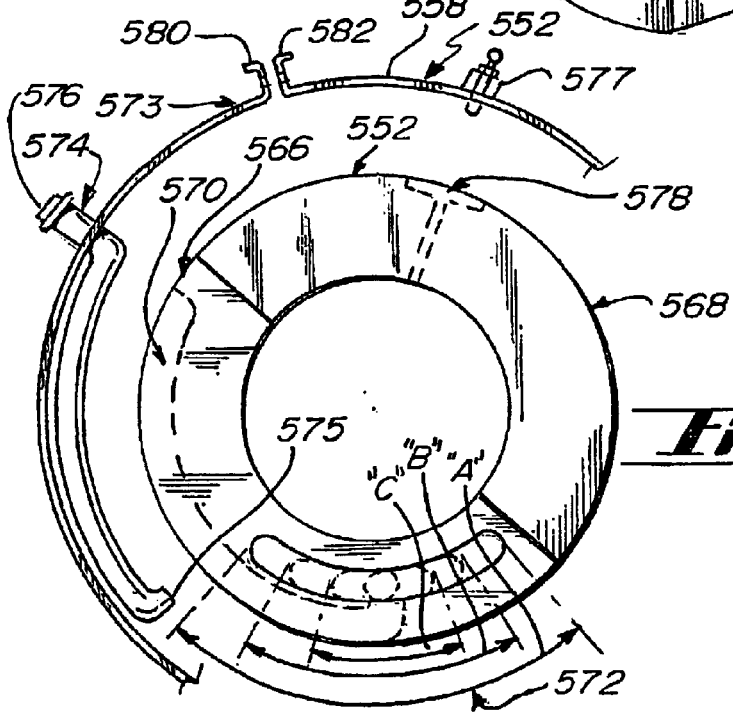
FIG. 11 is a cross sectional view of the metering, ring of FIG. 10 operably disposed about the spacer of FIG. 9.

As shown in FIGS. 9–11, the present aerator may be used to apply a fluid by including a metering spacer 550 and a metering ring 552 of the present invention. The metering spacer 550 and metering ring 552 depict an optional liquid metering system, wherein fluids (e.g., fertilizers) are placed below the surface of a soil profile by the present aerator implement during an aeration procedure.

Referring to FIG. 9, the generally cylindrical spacer 550 defines a plurality of generally axial lumens 556, each lumen 556 extending between respective inboard (intake) and outboard ports 558 and 560. The inboard ports 558 open into a generally circumferential groove 562. In this embodiment the number of lumens is determined by the number of injection sites, e.g., the number of tines. Diameters of the lumens 556 are determined by such factors as the amount and viscosity of the fluid to be applied.

FIG. 10 depicts one embodiment of the present metering ring at 552, which includes ring portions 566 and 568. The ring portion 566 defines a liquid transport tube groove 570 and an optionally variable length metering slot 572. Increasing slot lengths will increase the exposure time of the lumen inboard (intake) ports to fluids being applied. Thus, by increasing the length of the metering slot, the present metering ring will dispense increasing quantities of liquids. Specific quantities of fluids dispensed depend on such factors as temperature, pressure, implement speed, and the viscosity of the fluid being dispensed.

A cross-sectional depiction of the metering ring 552 and a band 573 is shown in FIG. 11, wherein "C," "B," and "A" depict increasing lengths of the slot 572. The metering spacer 550 would be enclosed within the metering ring 552, but is omitted in FIG. 11 for clarity. A tube 574 extends through the band 573. An end 575 of the tube 574 is disposed at least partially within the groove 570 of the ring portion 566. The fluid to be dispensed is conveyed from a pressurized source (not shown), through an ingress end 576 of the tube 574, out through the tube end 575, and through the slot 572. The fluid then enters the spacer groove 562, from which the fluid enters the lumens 556 via the inboard ports 558. The lumens 556 convey the fluid to tine locations. At the tines, the fluid is dispensed into the soil by being forced through one of the orifices at the base of the present tine and out the slot 150 or 250. Each lumen may supply more than one tine location. Alternatively, elimination of the outlet in the tine base area can permit selecting specific locations for injection while eliminating other locations. The spacer 550 and metering ring 552 are lubricated by means of a lubrication fitting, such as a zerk 577, and a lubricant slot 578. In this embodiment, the zerk 577 is disposed in the band 573 and the lubricant slot is defined in the ring portion 568. The band 573 may be secured around the ring sections 566 and 568 and the spacer 550 by a fastener, such as a screw or bolt (not shown) extending through the lips 580 and 582.

Figure 12:
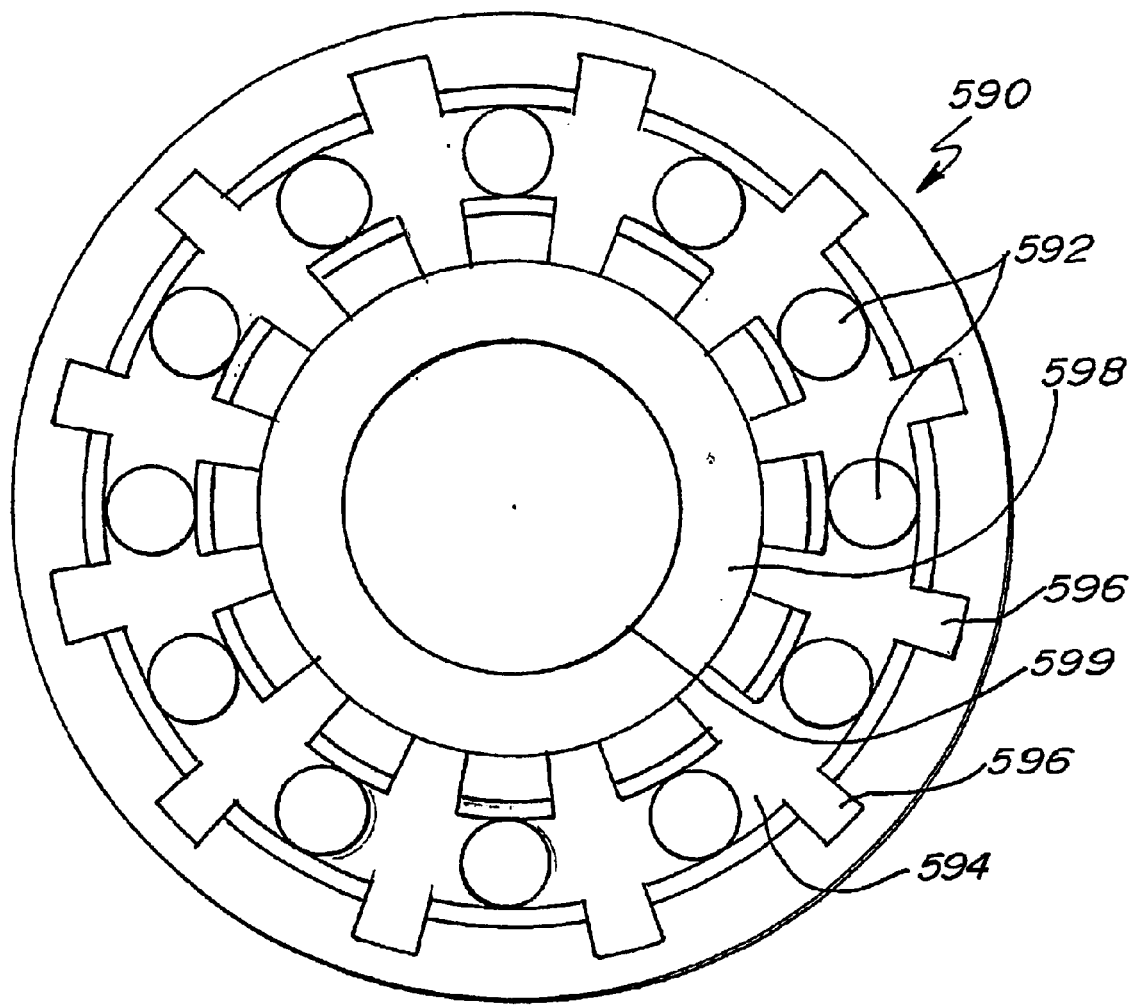
FIG. 12 is a side view of a spacer of the present invention.

FIG. 12 shows one embodiment of a generally unitary spacer of this invention generally at 590. The spacer defines orifices 592, which may be dimensioned and positioned to be in registry with the lumens 556 of the spacer 550. A generally circular raised portion 594 intersects optional radial raised portions 596. The raised portion 594 is dimensioned and positioned to fit into the arcuate slot present in the base of the present tine. The raised portions 596 are dimensioned and positioned to fit into the radial slots present in some embodiments of the present tine base. Another generally circular raised portion 598 is disposed outside an orifice 599. The raised portion 598 aligns with the third edges of the third edges 118 and 218 of the present tine. The spacer is secured in place using a fastener such as an arbor bolt extending through the orifice 599. Alternatively, the raised portions may be substituted for depressions or grooves if the present tine includes raised surfaces in lieu of slots. The spacer 590 may be used in the place of the present shims. If used in place of the shims described herein, a pair of the spacers 590 could have sloped portions present in the raised surface 594, rather than the smooth surface depicted.

In one embodiment, the present tines are mounted on the hubs as depicted above, such that the edge 112 or 212 becomes the "leading edge" by entering the ground first. After the tine reaches a vertical position at 90 degrees (6 o'clock) within the soil, the edge 114 or 214 becomes the leading edge, wherein the edge 114 or 214 and optionally one of the blade surfaces begin to fracture the compaction zone by cutting into the soil and uplifting some portion of the soil onto the soil surface. The amount of soil fractured and uplifted is determined in part by the tine attitude and degree of rotation. Pluralities of the present tines are functionally mounted to axles to comprise a gang of several tine sets. The gang axles may be deployed so as to be generally perpendicular to the direction of travel. Alternatively, the gang axles may be deployed at an angular departure to the perpendicular. Soil fracturing and uplifting will usually be increased as the present gang axle is angled away from a perpendicular deployment. Thus, another factor determining the amount of soil fracturing and uplifting is the angle at which a gang of the present tines is deployed.

Partially because the arcuate grooves in the base of the present tine may extend between the fourth and fifth edges as described above, the present tine may be reversed. In a reversed position the edge 114 or 214 becomes the leading edge as the tine is rotated into the soil and the edge 112 or 212 becomes the leading edge as the tine is rotated out of the soil. Reversing the present tine may cause more soil to be uplifted and deposited on the soil surface, thereby minimizing volatilization loss of some applied fluids, e.g., anhydrous ammonia. The concave surface and gridding cause soil to adhere to the tine surface. Soil adhering to the tine surface then abrades against soil particles in the soil profile being aerated when the tine is rotated into and out of the soil. Thus, the concave surface and gridding prolong the useful life of the present tine by abrading soil-against-soil, rather than soil against the present tine surface.

The present tines are mounted between the hubs as depicted and described above. There are usually three or four tines mounted per hub. However, more or fewer tines can be mounted as well. The tines can be mounted in configurations denoted as "P," "L," and "S". These configurations describe the orientations of tine gangs on opposing sides of the implement center axis. The present tines are mounted in an aerator implement to achieve a desired tine attitude, degree of rotation, and direction of rotation. Desired directions of rotation are provided with reference to the right side of the implement centerline (from the perspective of the direction of travel). Tines disposed to the left of the implement centerline will normally be rotated oppositely. In aerators with a P configuration, the tines are inclined toward (tine tips point toward) the implement centerline and the tines to the right of the implement centerline are rotated clockwise (as viewed from the front of the implement). In aerators with an L configuration, the tines are inclined toward the implement centerline and the tines to the right of the implement centerline are rotated counterclockwise (as viewed from the front of the implement). In the S attitude, the tines are inclined away from (the tine tips point away from) the implement centerline and the tines to the right of the implement centerline are usually rotated clockwise (as viewed from the front of the implement and as disclosed in the above-referenced U.S. Pat. No. 4,840,232).

The P and L configurations result in reduced entry resistance into the soil as compared to the S configuration. The P configuration develops all fracturing forces during the first 90 degrees of tine rotation into the soil. As tine rotation approaches the end of the first 90 degrees of rotation, the tine undergoes a twisting action, wherein the tine exerts diminishing pressure against the soil and root systems. In the final 90 degrees of rotation, little or no soil uplift occurs. Tines in the P configuration enter the soil more easily than tines in the L configuration because of a forward facing thrust surface. Increased implement speed increases the penetration of tines disposed in the P configuration. By contrast increased speed reduces the penetration of tines disposed in the L configuration. In the L configuration, soil fracture in the first 90 degrees of rotation is minimal because only the beveled and perpendicular edges of the tine are displacing the soil.

During the final 90 degrees of rotation, the twisting tine of the L configuration pushes vertically and displaces soil much as would a disk blade on a disk harrow. Offsetting the tine at a greater angle would create even more uplift, more extensive fracturing, and greater root system damage and dislodgement. The S configuration places the tine on the opposite side of the machine, so that as the swing arm is offset, the tine must begin a sweep sideways further to arrive at the vertical position during the tine entry phase of rotation. The tip of the tine, then toward or away from, the centerline of the machine centerline, is the difference between the S configuration being away from the centerline, and the P and L configurations being toward the centerline of the machine. Tines in the S configuration require more force to penetrate soil surfaces than tines in the P and L configuration. A tine in the S configuration creates a "smearing action" in the first 90 degrees of rotation into the soil. In the final 90 degrees, the twisting action of the tine uplifts variably sized lumps of soil onto the soil surface.

Because numerous modifications of this invention may be made without departing from the spirit thereof, the scope of the invention is not to be limited to the embodiments illustrated and described. Rather, the scope of the invention is to be determined by the appended claims and their equivalents.

What is claimed is:

1. A soil aerator comprising:

a plurality of axles, each axle ending with a hub, each hub with in inboard surface;

a plurality of tines, each said tine comprising a base and a blade, the tine base displaying first and second sides and comprising a plurality of holes extending between the first and second sides of the tine base, the tine blade displaying first and second edges configured to engage and penetrate a soil profile, each said tine further comprising a slot opening into one of said tine base holes;

a plurality of pairs of angular adjusting devices, each said angular adjusting device with first and second opposite surfaces, the first adjustment device surface substantially conforming to the hub inboard surface, the second adjustment device surface having a further raised surface configured to be accommodated in the tine base groove, each of said plurality of tines cooperating with one pair of said plurality of angular adjustment devices to mount said tine in a rotatably adjustable position, each said tine and each said plurality of angular adjusting devices disposable between two of said hubs; and a fluid application system in fluid communication with the tine slot.

2. The soil aerator of claim 1, in which each of said plurality of pairs of angular adjusting devices is further configured so as to incline one of said tines toward or away from an aerator centerline.

3. The soil aerator of claim 1, in which each said tine base comprises a generally arcuate slot.

4. The soil aerator of claim 1, in which each said tine base is configured such that each said tine is reversibly mountable.

5. The soil aerator of claim 1, in which each said tine blade comprises a soil retaining geometry.

6. The soil aerator of claim 5, in which the soil retaining geometry comprises a raised grid.

7. The soil aerator of claim 5, in which the soil retaining geometry comprises a generally concave portion of the tine blade.

8. The soil aerator of claim 1, the fluid application system comprising a spacer and a metering ring, the spacer defining a plurality of lumens and a central groove, each said lumen with an inboard port and an outboard port, the inboard port opening into the central groove, each outboard opening in fluid communication with the tine slot.

9. A tine for aerating soil, comprising:

a base with a base surface and a base thickness; and a blade with a blade surface and a minimum blade thickness at a minimum thickness locus, the minimum blade thickness less than the base thickness, the base and blade cooperating to define a transition zone beginning at a transition point, the transition zone being between the base thickness and the minimum blade thickness locus, in which a line extending between the transition point and the minimum thickness locus is angled from the base surface between about 1 degree and 20 degrees.

10. The tine of claim 9, in which the line extending between the transition point and the minimum thickness locus is angled from the base surface between about 5 degrees and 15 degrees.

11. The tine of claim 9, in which the line extending between the transition point and the minimum thickness locus is angled from the base surface about 10 degrees.

12. An aerator assembly for aerating soil, the assembly comprising: two hubs, each having an outer circumference and being in coaxial alignment; a plurality of arcuate wedge shaped shims, each shim having a thicker end and a thinner end, the shims being adapted to be sandwiched within the two hubs; a plurality of aerator tines each having a blade portion and a base portion, each of the base portions of the plurality of aerator tines sandwiched between a pair of the wedge shaped shims and secured between the hubs along with the shims, the wedge shaped shims securing the tines at a desired angle, and the arcuate shims are aligned with the outer circumferences of the hubs.

13. The aerator assembly of claim 12, in which the base portion of each tine defines a hole adapted for securing the base portion between the arcuate wedge shaped shims, wherein each of said arcuate wedge shaped shims has a corresponding hole, wherein each hub has a corresponding hole, and wherein a bolt extends through said hole in the base portion, holes in said arcuate wedge shaped shims, and holes in the two hubs.

14. The aerator assembly of claim 12, in which each tine defines a passage whereby fluid may be discharged from within the aerator assembly outwardly into the soil.

15. The aerator assembly of claim 14, in which at least one hub defines a plurality of fluid passages whereby fluid may be transported to at least some of the plurality of tines.

16. The aerator assembly of claim 12, in which the thickness of the thicker end and the thinner end is selected to adjust the angle of the tines relative to the hubs.

17. The aerator assembly of claim 12, in which the plurality of shims are arranged in two rows and the plurality of tines are sandwiched between the plurality of shims and the two rows of shims and the plurality of tines are further sandwiched between the two hubs.

18. A method for securing aerator tines in an aerator assembly, the method comprising the steps of:

positioning two hubs in a coaxial orientation;

interposing between the two hubs a plurality of arcuate wedge shaped shims, the shims each having a thicker end and a thinner end;

interposing between the two hubs a plurality of aerator tines each tine having a base portion and a blade portion;

securing the two hubs, the plurality of shims and the plurality of tines so as to fix the tines at a desired angle between the hubs; and adjusting the thickness of the thicker end and the thinner end to adjust of the tines relative to the hubs.

19. The method of claim 18, further comprising the step of placing the hubs between a row of the tines between two rows of the shims and securing the row of tines and the two rows of shims between the hubs.

20. The method of claim 18, further comprising the step of creating a fluid passage in at least some of the plurality of tines such that a fluid may be discharged therethrough into the soil.

21. The method of claim 20, further comprising the step of creating a plurality of fluid passages in at least one of the hubs to supply fluid to the fluid passage in the tines.

* * * * *

UNITED STATES PATENT AND TRADEMARK OFFICE
CERTIFICATE OF CORRECTION

PATENT NO. : 6,854,525 B2
DATED : February 15, 2005
INVENTOR(S) : James Martindale It is certified that error appears in the above-identified patent and that said Letters Patent is hereby corrected as shown below:

Column 1,
Line 8, delete second occurrence of "No.".
Line 8, delete first occurrence of "No." and insert -- Nos. --.

Column 2,
Line 30, delete "28" and insert -- 20 --.

Column 5,
Line 32, after the word "metering" delete ",".

Column 7,
Line 4, after "254" insert -- . --.
Line 60, after "432" insert -- , --.

Signed and Sealed this

Twenty-seventh Day of September, 2005

JON W. DUDAS
*Director of the United States Patent and Trademark Office*